US012210798B2

(12) United States Patent
Sagawa et al.

(10) Patent No.: US 12,210,798 B2
(45) Date of Patent: Jan. 28, 2025

(54) ACOUSTIC DEVICE INCLUDING DISPLAY PANEL AND TOUCH PANEL AND APPLYING EFFECT TO INPUT AUDIO BASED ON TOUCH OPERATION ON TOUCH PANEL, AND OPERATION METHOD AND OPERATION PROGRAM THEREFOR

(71) Applicant: AlphaTheta Corporation, Yokohama (JP)

(72) Inventors: Kenta Sagawa, Yokohama (JP); Yusuke Tsuda, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 18 days.

(21) Appl. No.: 18/044,672

(22) PCT Filed: Sep. 11, 2020

(86) PCT No.: PCT/JP2020/034610
§ 371 (c)(1),
(2) Date: Mar. 9, 2023

(87) PCT Pub. No.: WO2022/054264
PCT Pub. Date: Mar. 17, 2022

(65) Prior Publication Data
US 2024/0028291 A1     Jan. 25, 2024

(51) Int. Cl.
*G06F 3/048*     (2013.01)
*G06F 3/0354*    (2013.01)
(Continued)

(52) U.S. Cl.
CPC .......... *G06F 3/165* (2013.01); *G06F 3/03547* (2013.01); *G06F 3/04847* (2013.01); *G06F 3/0488* (2013.01)

(58) Field of Classification Search
CPC .. G06F 3/165; G06F 3/03547; G06F 3/04847; G06F 3/0488; G06F 3/04883;
(Continued)

(56) References Cited

U.S. PATENT DOCUMENTS

| 7,671,269 B1 * | 3/2010 | Krueger ............... G10H 1/0008 |
| | | 84/723 |
| 2003/0028516 A1 * | 2/2003 | Nakata ................. G10H 1/0025 |

(Continued)

FOREIGN PATENT DOCUMENTS

| JP | 2000-250539 A | 9/2000 |
| JP | 2014-93727 A | 5/2014 |
| JP | 2016-19086 A | 2/2016 |

OTHER PUBLICATIONS

Ketabdar et al., igital Music Performance for Mobile Devices Based on Magnetic Interaction, 2011, IEEE, 10 pages. (Year: 2011).*

(Continued)

*Primary Examiner* — Linh K Pham
(74) *Attorney, Agent, or Firm* — Rankin, Hill & Clark LLP (57) ABSTRACT

An acoustic device includes a touch panel for detecting a user's touch operation, a value setting section for setting a parameter value based on the touch operation detected by the touch panel, and an output control section for processing an inputted audio based on the parameter value set by the value setting section and outputting the processed audio. The value setting section sets the parameter value in accordance with a moving direction and a moving speed of a touch position from a start point that is the touch position on the touch panel at a start of the touch operation to an end point that is the touch position at an end of the touch operation.

10 Claims, 9 Drawing Sheets

(51) Int. Cl.
  *G06F 3/04847* (2022.01)
  *G06F 3/0488* (2022.01)
  *G06F 3/16* (2006.01)

(58) Field of Classification Search
  CPC ....... G10H 2210/241; G10H 2220/096; G10H 2220/161; G10H 1/0091; H04S 7/30
  See application file for complete search history.

(56) References Cited

U.S. PATENT DOCUMENTS

| | | | |
|---|---|---|---|
| 2003/0159567 A1* | 8/2003 | Subotnick | G06F 3/04883 84/610 |
| 2009/0122018 A1 | 5/2009 | Vymenets et al. | |
| 2011/0063230 A1* | 3/2011 | Mazur | G10H 1/0091 345/173 |
| 2011/0130200 A1* | 6/2011 | Terada | H04H 60/04 463/31 |
| 2011/0191674 A1* | 8/2011 | Rawley | G06F 3/016 715/702 |
| 2012/0072841 A1* | 3/2012 | Moricca | G06Q 10/10 715/716 |
| 2013/0132838 A1* | 5/2013 | Daisy | G06F 3/0488 715/716 |
| 2013/0263721 A1* | 10/2013 | Shavit | G10H 1/055 84/626 |
| 2014/0225845 A1* | 8/2014 | Muzar | G06F 3/041 345/173 |
| 2015/0063577 A1* | 3/2015 | Song | G10H 1/0091 381/61 |
| 2015/0086048 A1* | 3/2015 | Brown | H04R 7/045 381/152 |
| 2015/0110281 A1* | 4/2015 | Mizuhiki | G10H 1/0091 381/61 |
| 2017/0011724 A1* | 1/2017 | Cook | G10H 1/368 |
| 2017/0047053 A1* | 2/2017 | Seo | G10H 1/053 |
| 2018/0350337 A1 | 12/2018 | Netherland | |
| 2022/0013097 A1* | 1/2022 | Barkley | G10H 1/46 |
| 2022/0394354 A1* | 12/2022 | Takahashi | H04N 21/6587 |

OTHER PUBLICATIONS

Yuksel et al., Towards Digital Music Performance for Mobile Devices Based on Magnetic Interaction, 2010, IEEE, 6 pages.*
International Search Report dated Dec. 1, 2020, Application No. PCT/2020/034610; English translation included, 4 pages.
International Preliminary Report on Patentability dated Mar. 7, 2023, Application No. PCT/JP2020/034610, 4 pages.
Extended European Search Report dated Apr. 17, 2024, Application No. 20953329.8; 10 pages.

* cited by examiner

ACOUSTIC DEVICE INCLUDING DISPLAY PANEL AND TOUCH PANEL AND APPLYING EFFECT TO INPUT AUDIO BASED ON TOUCH OPERATION ON TOUCH PANEL, AND OPERATION METHOD AND OPERATION PROGRAM THEREFOR

TECHNICAL FIELD

The present disclosure relates to an acoustic device, an operation method, and an operation program.

BACKGROUND ART

Some of known effectors, which are provided with a planar position sensor, are configured to apply effects to inputted audio signals in accordance with a user's operation on the planar position sensor (see, for instance, Patent Literature 1).

The effector disclosed in Patent Literature 1 is configured to manipulate two different effect parameters in accordance with variations in x and y coordinates of a pressed portion on the planar position sensor by an operator. For instance, when "resonance" is assigned to the x axis and "frequency" is assigned to the y axis, processes for changing the "resonance" and "frequency" are respectively applied to audio signals in accordance with the variations in the x and y coordinates of the pressed position. As described above, two effects are applied to the inputted audio signals in accordance with the user's operation on the planar position sensor.

CITATION LIST

Patent Literature(s)

Patent Literature 1 JP 2000-250539 A

SUMMARY OF THE INVENTION

Problem(s) to be Solved by the Invention

However, the effector disclosed in Patent Literature 1 manipulates the parameter values for the effects on the basis of the pressed position on the planar position sensor by the operator. Accordingly, it is necessary to keep pressing the planar position sensor in order to change the parameter values, which complicates the operation for changing the parameter values.

An object of the present disclosure is to provide an acoustic device, an operation method, and an operation program capable of easily changing parameter values.

Means for Solving the Problem(s)

According to a first aspect of the present disclosure, there is provided an acoustic device including: a touch panel configured to detect a user's touch operation; a value setting section configured to set a parameter value based on the touch operation detected by the touch panel; and an output control section configured to process an inputted audio based on the parameter value set by the value setting section and output the processed audio, in which the value setting section is configured to set the parameter value in accordance with a moving direction and a moving speed of a touch position from a start point, which is the touch position at a start of the touch operation on the touch panel, to an end point, which is the touch position at an end of the touch operation.

According to a second aspect of the present disclosure, there is provided an operation method performed using an acoustic device provided with a touch panel and configured to apply an effect to an inputted music piece, the operation method including setting a parameter value of the effect in accordance with a moving direction and a moving speed of a touch position from a start point, which is the touch position at a start of a user's touch operation on the touch panel, to an end point, which is the touch position at an end of the touch operation.

According to a third aspect of the present disclosure, there is provided an operation program performed using an acoustic device provided with a touch panel and configured to apply an effect to an inputted music piece, the operation program being configured to make the acoustic device perform setting a parameter value of the effect in accordance with a moving direction and a moving speed of a touch position from a start point, which is the touch position at a start of a user's touch operation on the touch panel, to an end point, which is the touch position at an end of the touch operation.

An acoustic device capable of easily changing parameter values can be provided by the acoustic device, the operation method, and the operation program according to the above aspects.

DESCRIPTION OF EMBODIMENT(S)

An exemplary embodiment of the present disclosure will be described below with reference to the attached drawings.

Overall Structure of Acoustic System

Figure 1:
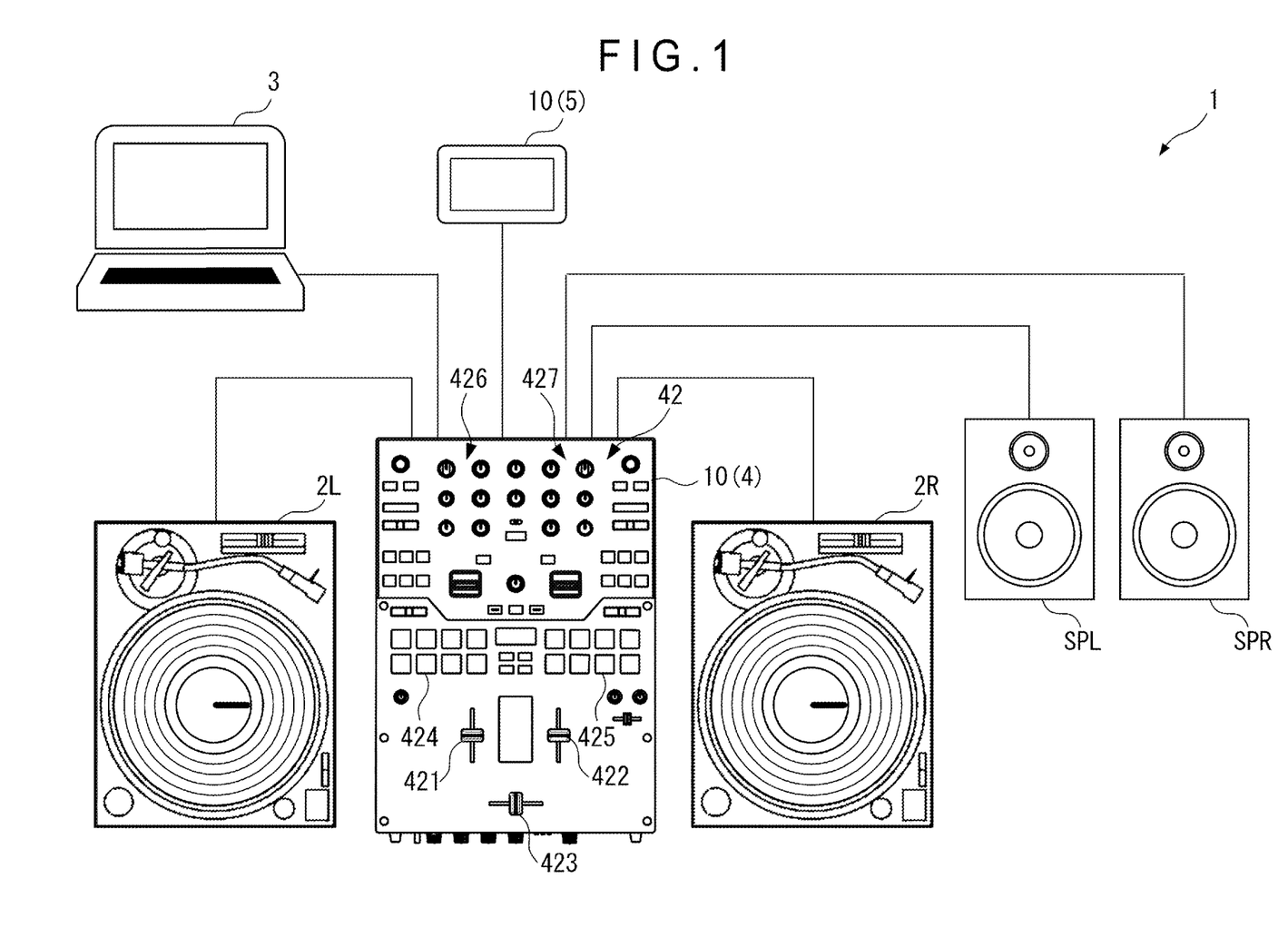
FIG. 1 schematically shows an arrangement of an acoustic system according to an exemplary embodiment.

FIG. 1 schematically shows an arrangement of an acoustic system 1 according to the exemplary embodiment.

As shown in FIG. 1, the acoustic system 1 includes an acoustic device 10, turntables 2L and 2R, a music piece supply device 3, and speakers SPL and SPR. In the acoustic system 1, audio supplied from the music piece supply device 3 is mixed by a mixer 4 of the acoustic device 10, and the mixed audio is outputted through the speakers SPL and SPR. The acoustic system 1, which includes a built-in digital vinyl system (DVS), is configured to control playing conditions of music piece data played by the music piece supply device 3 for respective channels in accordance with operation(s) performed on the turntables 2L and 2R.

Structure of Turntable

The turntables 2L and 2R are configured to play a timecode record (control vinyl) recorded with a timecode. User's operation (e.g. scratch) is performed on the timecode record. The turntables 2L and 2R are configured to read the timecode recorded on the timecode record and output the read timecode. The timecode thus read out is inputted to the music piece supply device 3 through the mixer 4.

The turntable 2L controls a playing condition of a music piece data that is an audio source of a first channel, and the turntable 2R controls a playing condition of a music piece data that is an audio source of a second channel. In other words, the timecode outputted by each of the turntables 2L and 2R can be regarded as an operation signal for operating the music piece supply device 3.

It should be noted that the turntables 2L and 2R are not indispensable.

Structure of Music Piece Supply Device

The music piece supply device 3 is configured to output an audio for the first channel to the mixer 4 and output an audio for the second channel to the mixer 4. Though not illustrated, the music piece supply device 3 includes a first play section for playing a first music piece data and outputting a first music piece based on the first music piece data as the audio for the first channel and a second play section for playing a second music piece data and outputting a second music piece based on the second music piece data as the audio for the second channel.

Upon receipt of the timecode from the turntable 2L, the first play section plays the first music piece data based on the inputted timecode.

Upon receipt of the timecode from the turntable 2R, the second play section plays the second music piece data based on the inputted timecode.

The music piece supply device 3 can be provided by an information processing device that runs a DJ application software. Examples of the information processing device include a personal computer (PC) and a smartphone.

Structure of Speakers

The speakers SPL and SPR are each configured to output an audio in accordance with an audio signal inputted from the mixer 4. The speakers SPL and SPR output a left audio and a right audio, respectively. When the speakers SPL and SPR have no amplifier function, an amplifier for amplifying the inputted audio signal may be provided between the mixer 4 and the speakers SPL, SPR.

Structure of Acoustic Device

The acoustic device 10 includes the mixer 4 configured to mix audios inputted from the music piece supply device 3 to output the mixed audios to the speakers SPL and SPR, and an operation device 5 configured to transmit an operation signal to the mixer 4 in accordance with a user's operation. As detailed later, the mixer 4 is configured to apply effects to the audio inputted from the music piece supply device 3 in accordance with the user's operation on the operation device 5.

Structure of Mixer

Figure 2:
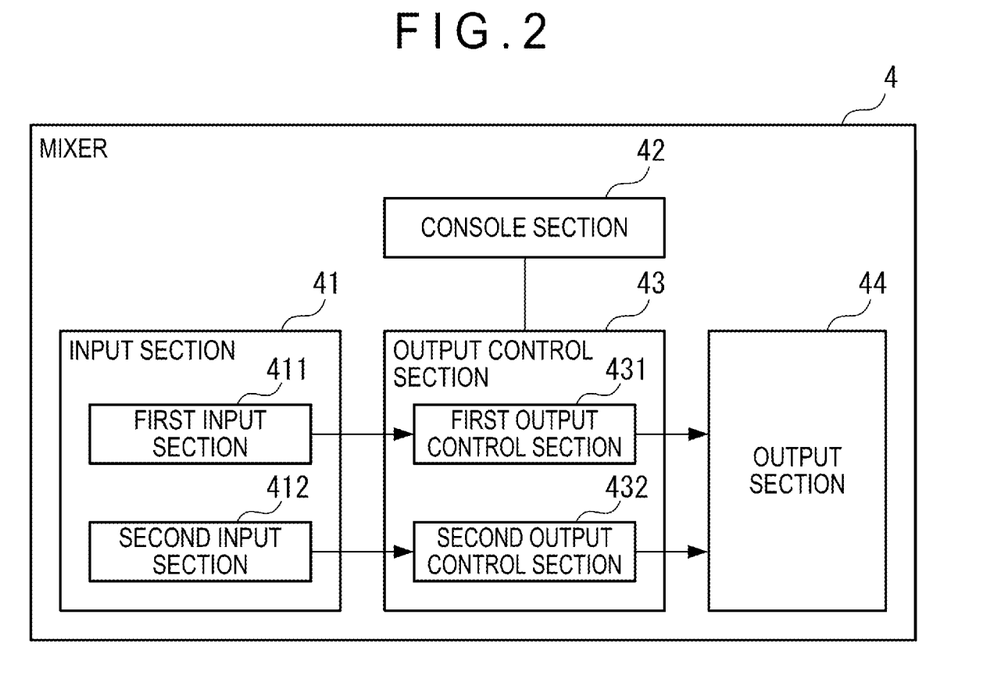
FIG. 2 is a block diagram of an arrangement of a mixer according to the exemplary embodiment.

As described above, the mixer 4 is configured to mix a plurality of audios inputted from the music piece supply device 3 and also apply effects to the inputted audios. The mixer according to the exemplary embodiment, which is a 2-channel mixer, mixes the first music piece (i.e. the audio for the first channel) and the second music piece (i.e. the audio for the second channel) to output audio signals corresponding to the mixed music piece to the speakers SPL and SPR, and in addition, processes the first and second music pieces.

FIG. 2 is a block diagram of a structure of the mixer 4.

As shown in FIG. 2, the mixer 4 includes an input section 41, a console section 42, an output control section 43, and an output section 44.

The input section 41 includes a first input section 411 and a second input section 412. The first input section 411 receives the first music piece (the audio for the first channel) from the music piece supply device 3. The second input section 412 receives the second music piece (the audio for the second channel) from the music piece supply device 3.

The console section 42, which includes a plurality of operation elements (e.g. button(s), knob(s), and fader(s)), is configured to output operation signals in accordance with user's operations on the operation elements.

For instance, as shown in FIG. 1, the console section 42 includes a first channel fader 421 for adjusting an audio volume of the first channel, a second channel fader 422 for adjusting an audio volume of the second channel, and a cross fader 423 for adjusting a ratio between the audio volume of the first channel and the audio volume of the second channel.

The console section 42 further includes, for instance, a plurality of first pads 424 for applying predetermined effects to the audio for the first channel and a plurality of second pads 425 for applying predetermined effects to the audio for the second channel.

The console section 42 further includes, for instance, a first channel control section 426 for processing the audio for the first channel and a second channel control section 427 for processing the audio for the second channel.

Though not illustrated, the first channel control section 426 and the second channel control section 427 each include a source-switching switch, a trim knob, three frequency-changing knobs, and a filter knob.

The source-switching switch switches an input source of the audio for the corresponding one of the channels.

The trim knob adjusts a level of the audio inputted to the corresponding one of the channels.

The three frequency-changing knobs increase/decrease audio volumes in high-frequency, mid-frequency, and low-frequency ranges of the corresponding one of the channels.

The filter knob applies a filter effect to the corresponding one of the channels.

The output control section 43 is configured to control an output of the audio for the corresponding one of the channels by controlling the audio for each channel inputted to the input section 41. The output control section 43 includes a first output control section 431 and a second output control section 432.

The first output control section 431 controls the output of the audio for the first channel by processing the audio for the first channel in accordance with a user's operation on the console section 42. The second output control section 432 controls the output of the audio for the second channel by processing the audio for the second channel in accordance with a user's operation on the console section 42.

For instance, the first output control section 431 and the second output control section 432 adjust the audio volumes of the first channel and the second channel in accordance with respective knob positions of the first channel fader 421, the second channel fader 422, and the cross fader 423.

For instance, the first output control section 431 applies effects, which are preset by the user, to the audio for the first channel in accordance with an input operation on the first pads 424 or an operation signal inputted through the operation device 5. Further, the second output control section 432 applies effects, which are preset by the user, to the audio for the second channel in accordance with an input operation on the second pads 425 or an operation signal inputted through the operation device 5.

Further, the first output control section 431 applies effects to the audio for the first channel based on information received from the later-described operation device 5. The second output control section 432 applies effects to the audio for the second channel based on information received from the later-described operation device 5.

Having received the audio signals inputted from the first output control section 431 and the second output control section 432, the output section 44 outputs a left-side signal to the speaker SPL and outputs a right-side signal to the speaker SPR.

Structure of Operation Device

Figure 3:
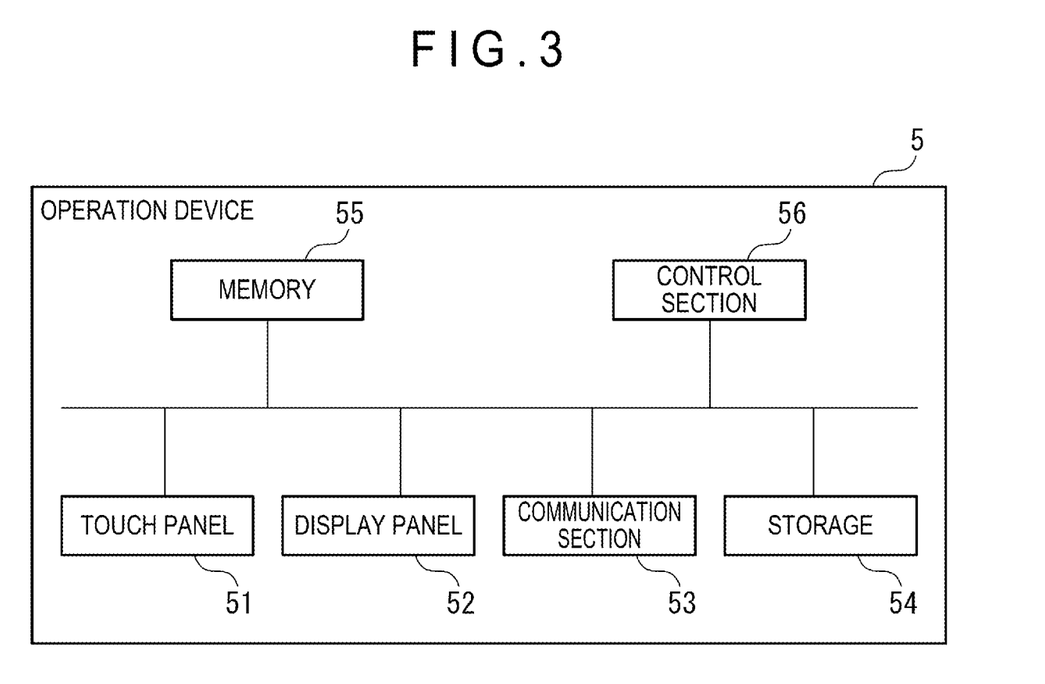
FIG. 3 is a block diagram of an arrangement of an operation device according to the exemplary embodiment.

FIG. 3 is a block diagram of a structure of the operation device 5.

The operation device 5 is configured to operate the mixer 4 in accordance with a user's operation. As shown in FIG. 3, the operation device 5 includes a touch panel 51, a display panel 52, a communication section 53, a storage 54, a memory and a control section 56. The operation device 5 is provided by, for instance, a smartphone or a tablet computer.

The touch panel 51 is configured to detect a touch operation by the user. Specifically, the touch panel 51 is a planar position sensor configured to detect a two-dimensional touch operation. The touch panel 51 is configured to output to the control section 56 coordinate values corresponding to a touch position by the user.

The display panel 52 is provided by a liquid crystal panel, an organic EL (electro-luminescence) panel, or the like. The display panel 52 is configured to display an image in accordance with an image signal inputted from the control section 56. The display panel 52 displays, for instance, a later-described operation screen PS.

The communication section 53 is configured to establish wired or wireless communication with the mixer 4.

The storage 54 stores a program and data necessary for the operation of the operation device 5. For instance, the storage 54 stores an operation program for the operation device 5 to transmit operation information to the mixer 4. It should be noted that the storage 54 may store music piece data so that the control section 56 plays the music piece data to produce a music piece and outputs the music piece to the mixer 4 through the communication section 53.

The memory 55 is a working memory of the control section 56.

Structure of Control Section

Figure 4:
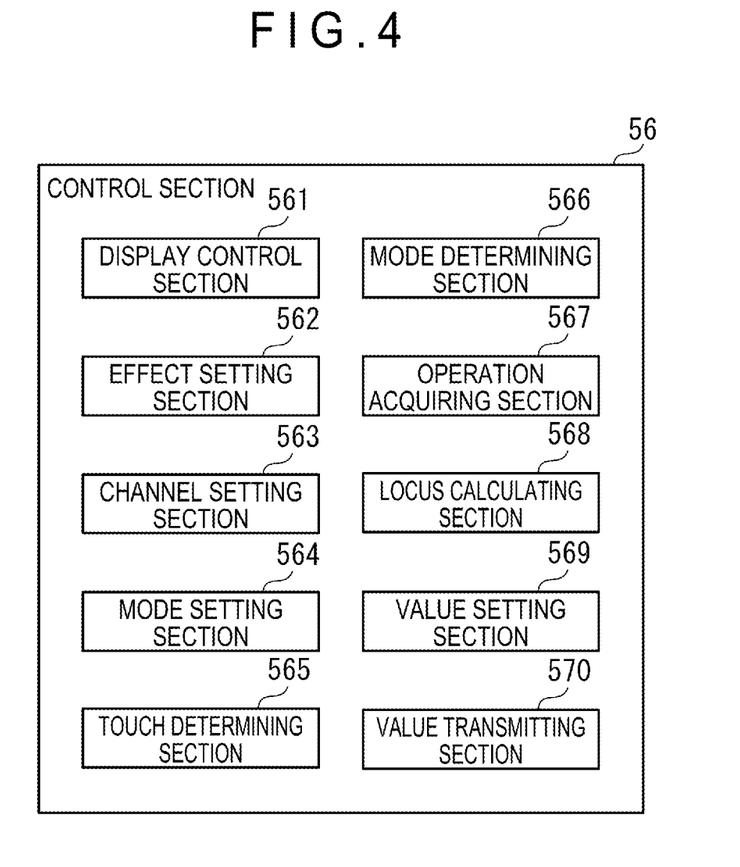
FIG. 4 is a functional block diagram of an arrangement of a control section according to the exemplary embodiment.

FIG. 4 is a functional block diagram of a structure of the control section 56. The control section 56, which includes an arithmetic processing unit such as a central processing unit (CPU), is configured to control the operation of the operation device 5. The control section 56 includes a display control section 561, an effect setting section 562, a channel setting section 563, a mode setting section 564, a touch determining section 565, a mode determining section 566, an operation acquiring section 567, a locus calculating section 568, a value setting section 569, and a value transmitting section 570.

The display control section 561 is configured to generate an image to be displayed by the display panel 52 and output the generated image to the display panel 52 so that the image is displayed on the display panel 52. Though not illustrated, examples of the image include an effect setting screen (not shown) for setting effects to be applied to the audio by the mixer 4 and the later-described operation screen PS (see FIG. 6).

It should be noted that the display control section 561 is configured to display a pointer PT (see FIG. 5) in a control range P1 of the later-described operation screen PS at a position corresponding to a touch position of the user on the touch panel 51. The arrangement of the operation screen PS will be detailed later.

The effect setting section 562 is configured to set effects to be applied to the audio by the mixer 4 in accordance with a user's operation on the effect setting screen. Specifically, the effect setting section 562 sets two effects. One of the two effects is an effect (X-axis effect) whose parameter value is set in accordance with the touch position or the position of the pointer PT in the X-axis of the later-described control range P1. The other of the two effects is an effect (Y-axis effect) whose parameter value is set in accordance with the touch position or the position of the pointer PT in the Y-axis of the control range P1.

It should be noted that the effect settable as the X-axis effect is one of the effects categorized into one of BEAT FX and SOUND COLOR FX. The effect settable as the Y-axis effect is one of the effects categorized into the other of BEAT FX and SOUND COLOR FX. In the exemplary embodiment, the effect settable as the X-axis effect is one of the effects categorized into BEAT FX, and the effect settable as the Y-axis effect is one of the effects categorized into SOUND COLOR FX.

Examples of the effects categorized into BEAT FX include ECHO, ROLL, and TRANS. Examples of the effects categorized into SOUND COLOR FX include FILTER, NOISE, and DUB ECHO.

The channel setting section 563 sets a channel to which the effects are applied.

The mode setting section 564 sets an operation mode of the operation device 5. The operation mode will be detailed later.

Based on coordinate values inputted from the touch panel 51, the touch determining section 565 determines whether the user has performed the touch operation on the touch panel 51 or the user has released the touch operation.

The mode determining section 566 determines the current operation mode of the operation device 5.

The operation acquiring section 567 and the locus calculating section 568 are configured to function when the operation mode of the operation device 5 is a later-described pinball mode or slingshot mode.

Based on coordinate values of a touch position inputted through the touch panel 51, the operation acquiring section 567 acquires a start point and an end point of the touch operation in the later-described control range P1 to calculate a moving direction and moving speed from the start point to the end point.

Based on the start point, end point, moving direction, and moving speed acquired by the operation acquiring section 567, the locus calculating section 568 calculates a locus of the pointer PT (see FIG. 5) in accordance with a movement time for the movement of the pointer PT from the end point. At this time, when the operation mode of the operation device 5 is the pinball mode, the locus calculated by the locus calculating section 568 is a locus of the pointer PT for the movement of the pointer PT from the end point in the acquired moving direction. When the operation mode of the operation device 5 is the slingshot mode, the locus calculated by the locus calculating section 568 is a locus of the pointer PT for the movement of the pointer PT from the end point in a direction opposite the acquired moving direction. Further, the locus calculating section 568 calculates the locus of the pointer PT so that the moving speed of the pointer PT gradually decreases. That is, the locus calculating section 568 calculates a position of the pointer PT in accordance with a time elapsed after the touch operation has ended.

The value setting section 569 sets parameter values for the effects to be transmitted to the mixer 4. A method of setting the parameter values by the value setting section 569 will be detailed later. Hereinafter, the parameter value for the X-axis effect is referred to as an X-axis parameter value and the parameter value for the Y-axis effect is referred to as a Y-axis parameter value. The X-axis parameter value represents a degree of the X-axis effect to be applied and the Y-axis parameter value represents a degree of the Y-axis effect to be applied.

The value transmitting section 570 transmits the type of effects set by the effect setting section 562, the channel set by the channel setting section 563, and the X-axis parameter value and the Y-axis parameter value set by the value setting section 569 to the mixer 4 through the communication section 53.

Arrangement of Operation Screen

Figure 5:
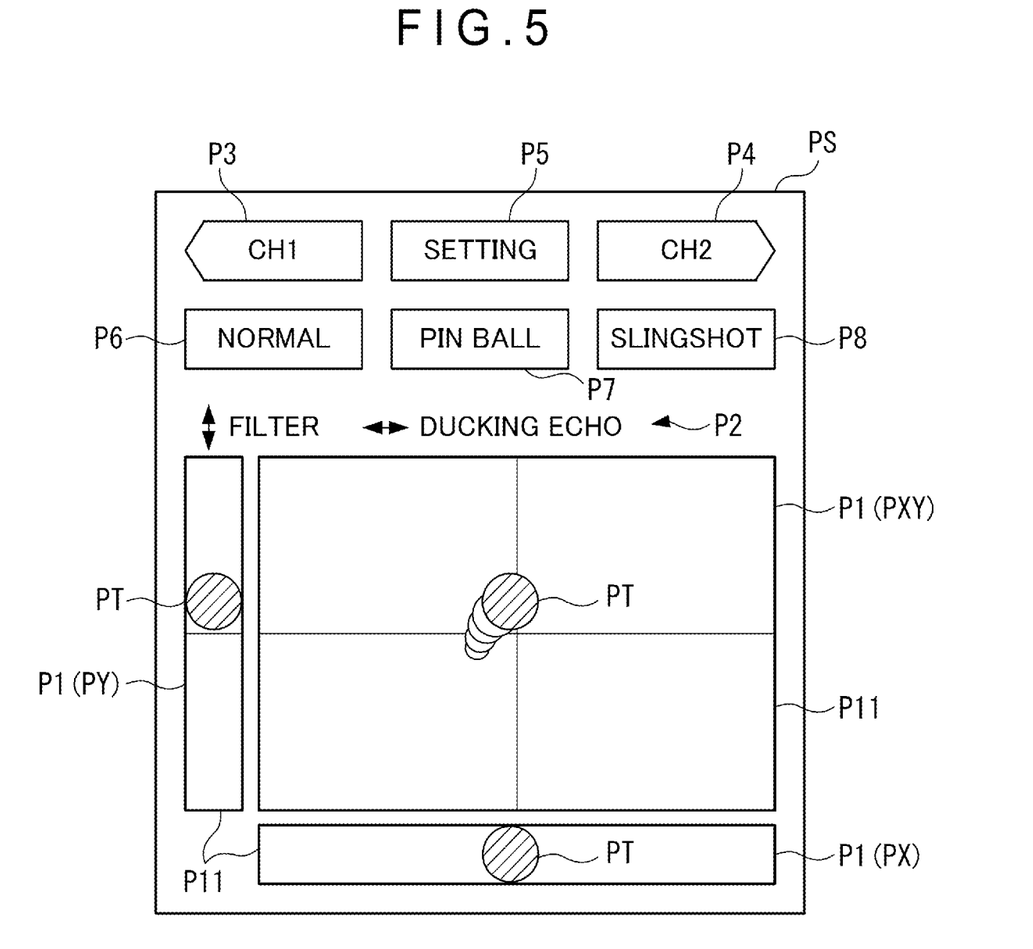
FIG. 5 shows an exemplary operation screen according to the exemplary embodiment.

FIG. 5 illustrates an exemplary operation screen PS.

An arrangement of the operation screen PS to be displayed on the display panel 52 by the display control section 561 will be described below.

The operation screen PS is used for manipulating a parameter value of at least one of the X-axis effect or the Y-axis effect set by the effect setting section 562. As shown in FIG. 5, the operation screen PS includes the control range P1, an effect display section P2, channel selection buttons P3 and P4, a screen switching button P5, and mode selection buttons P6 to P8.

The control range P1 is a range for receiving an operation for changing the parameter value. The control range P1 includes a control range PXY, control range PX, and control range PY.

The control range PXY is a rectangular range having mutually orthogonal X axis (horizontal axis) and Y axis (vertical axis). In the control range PXY, the X-axis parameter value and the Y-axis parameter value can be manipulated at the same time. The pointer PT is movably displayed by the display control section 561 in the control range PXY at a position corresponding to coordinate values of a user's touch operation detected by the touch panel 51. The value setting section 569 sets the X-axis parameter value and the Y-axis parameter value in accordance with the X-coordinate value and Y-coordinate value, respectively, of the touch position on the control range PXY or of the pointer PT in the control range PXY. That is, the control range PXY is a range where the user is capable of simultaneously manipulating the parameter values of two effects for selected one of the channels.

In an example of FIG. 5, a part of movement locus of the pointer PT is shown. However, the movement locus may not be displayed.

The control range PX is a rectangular range defined only with an X axis. In the control range PX, the X-axis parameter value can be manipulated. The control range PX is provided below the control range PXY. The control range PX is the same in dimension in the X axis as the control range PXY.

The pointer PT displayed in the control range PX is movable along the X axis. The value setting section 569 sets the X-axis parameter value in accordance with the X-coordinate value of the touch position on the control range PX or of the pointer PT in the control range PX.

The control range PY is a rectangular range defined only with a Y axis. In the control range PY, the Y-axis parameter value can be manipulated. The control range PY is provided at the left of the control range PXY. The control range PY is the same in dimension in the Y axis as the control range PXY.

The pointer PT displayed in the control range PY is movable along the Y axis. The value setting section 569 sets the Y-axis parameter value in accordance with the Y-coordinate value of the touch position on the control range PY or of the pointer PT in the control range PY.

Each of the control ranges PXY, PX, and PY is provided with a boundary P11 defining the boundary of the control ranges PXY, PX, and PY. As detailed later, when the operation mode of the operation device 5 is the pinball mode or the slingshot mode, a swipe operation may be performed like flicking the pointer PT against the boundary P11. In that case, the display control section 561 performs drawing of the pointer PT reflected at the boundary P11. The locus of the pointer PT at this time is calculated by the locus calculating section 568.

It should be noted that the pointers PT displayed in the control ranges PXY, PX, and PY move in conjunction with each other irrespective of which one of the control ranges PXY, PX, and PY is operated by the user.

For instance, when one of the pointers PT in the control range PXY and the control range PX is moved along the X axis, the other of the pointers PT is moved along the X axis in accordance with the X-coordinate value of the one of the pointers PT. At this time, as long as the pointer PT in the control range PXY is not moved along the Y axis, the pointer PT in the control range PY is not moved.

When one of the pointers PT in the control range PXY and the control range PY is moved along the Y axis, the other of the pointers PT is moved along the Y axis in accordance with the Y-coordinate value of the one of the pointers PT. At this time, as long as the pointer PT in the control range PXY is not moved along the X axis, the pointer PT in the control range PX is not moved.

Further, when the pointer PT in the control range PXY is moved in a direction slanted in both of the X and Y axes, the pointer PT in the control range PX is moved along the X axis in accordance with the X-coordinate value of the pointer PT in the control range PXY and the pointer PT in the control range PY is moved along the Y axis in accordance with the Y-coordinate value of the pointer PT in the control range PXY.

The effect display section P2 indicates the X-axis effect and the Y-axis effect set by the effect setting section 562. In the exemplary operation screen PS shown in FIG. 5, the displayed Y-axis effect is "FILTER" (one of SOUND COLOR FX) and the displayed X-axis effect is "DUCKING ECHO" (one of BEAT FX).

The channel selection buttons P3 and P4 are usable for selecting, from among the first channel and the second channel, a channel to which the effects are applied (target channel). The first channel is selected as the target channel by the channel setting section 563 upon pressing the channel selection button P3. The second channel is selected as the target channel by the channel setting section 563 upon pressing the channel selection button P4.

The screen switching button P5 is usable for switching the operation screen PS to another screen (e.g. an effect setting screen).

The mode selection buttons P6 to P8 are each usable for selecting the operation mode of the operation device 5. Upon an input operation on the mode selection button P6 that indicates "NORMAL", the operation mode is switched to a normal mode by the mode setting section 564. Upon an input operation on the mode selection button P7 that indicates "PIN BALL", the operation mode is switched to a pinball mode by the mode setting section 564. Upon an input operation on the mode selection button P8 that indicates "SLINGSHOT", the operation mode is switched to a slingshot mode by the mode setting section 564.

Normal Mode

The normal mode, pinball mode, and slingshot mode, which are selectable as the operation mode of the operation device 5, will be described below.

The normal mode is an operation mode, where the value setting section 569 sets the X-axis parameter value and the Y-axis parameter value in accordance with the touch position in the control range P1. In the normal mode, upon detection of the touch position, the pointer PT is displayed by the display control section 561 at a position corresponding to the touch position and the X-axis parameter value and the Y-axis parameter value are set by the value setting section 569 in accordance with the touch position. In the normal mode, when the touch operation is released (i.e. when a user's finger or a stylus pen is separated from the touch panel 51), the display control section 561 hides the pointer PT and the value setting section 569 stops the setting of the parameter values. That is, in the normal mode, the X-axis parameter value and the Y-axis parameter value are set and transmitted only while the touch operation is performed.

It should be noted that, when a swipe operation is performed on the touch panel 51 in the normal mode, the X-axis parameter value and the Y-axis parameter value corresponding to the swipe position are set.

Pinball Mode

Figure 6:
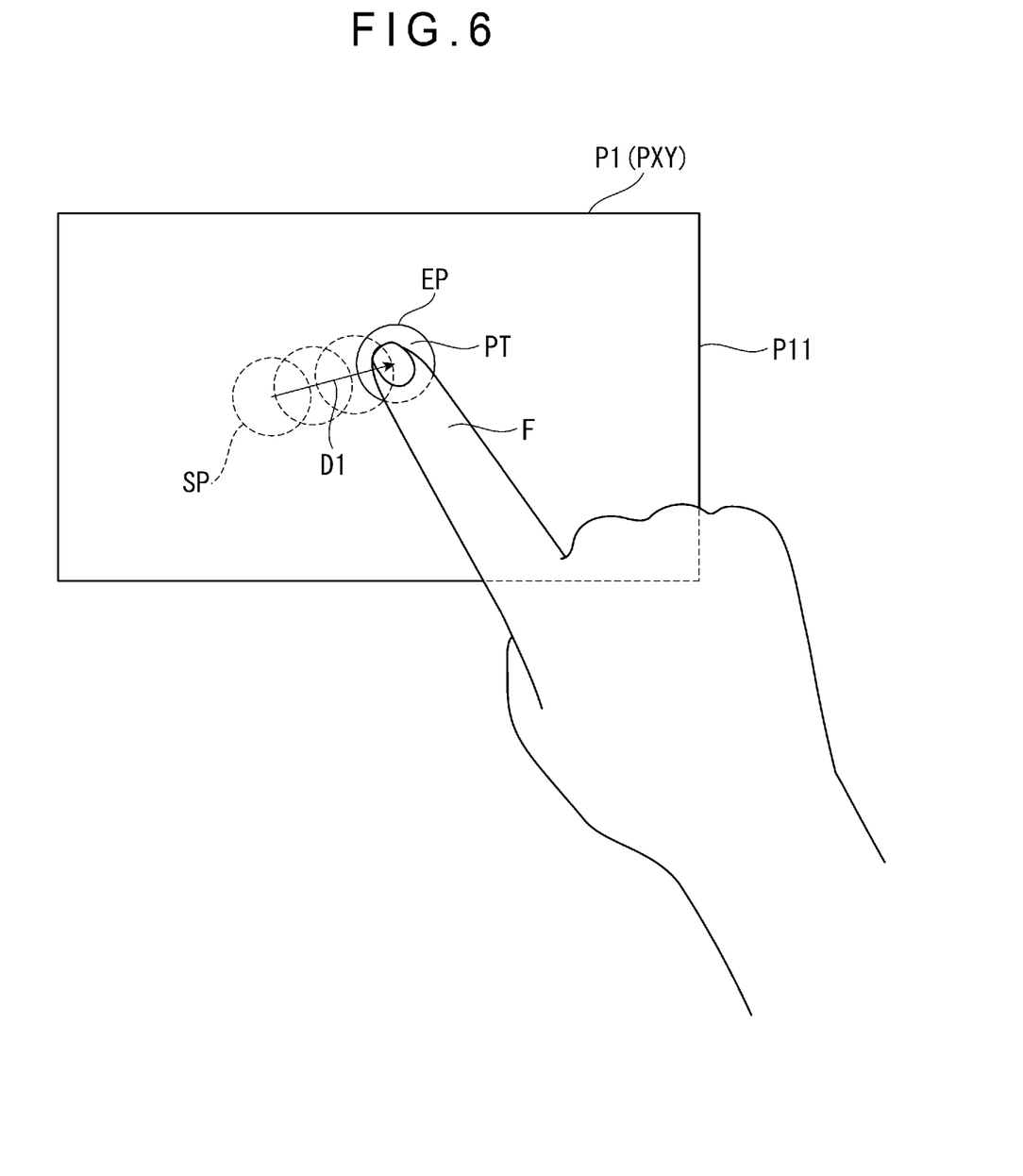
FIG. 6 illustrates a method of operating a control range in a pinball mode according to the exemplary embodiment.
Figure 7:
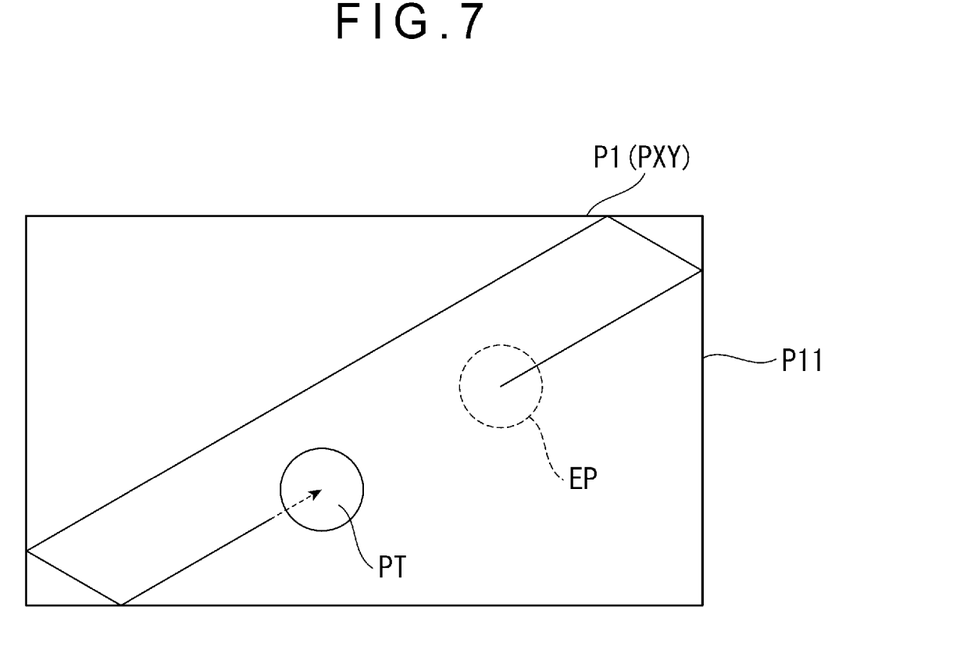
FIG. 7 illustrates an exemplary movement of a pointer in the pinball mode according to the exemplary embodiment.

FIG. 6 illustrates a method of operating the control range PXY in the pinball mode. FIG. 7 illustrates an exemplary movement of the pointer PT in the pinball mode.

The pinball mode is an operation mode, where the pointer PT is moved when the touch operation is released after the touch operation (specifically, the swipe operation) is performed in the control range P1 and the X-axis parameter value and the Y-axis parameter value are set based on the coordinate values of the pointer PT in the control range P1. In the pinball mode, upon detection of the touch position, the pointer PT is displayed by the display control section 561 in accordance with the touch position. Then, the operation acquiring section 567 acquires the start point and end point of the touch operation in the control range P1 as well as the moving direction and the moving speed from the start point to the end point.

For instance, when the user operates the control range PXY with their finger F as shown in FIG. 6, the operation acquiring section 567 acquires coordinate values of a start point SP at which the user's touch operation is started and coordinate values of an end point EP at which the user's touch operation is ended based on coordinate values inputted through the touch panel 51 and calculates a moving direction D1 and a moving speed of the touch position from the start point SP to the end point EP. The locus calculating section 568 performs a physical calculation based on the acquired coordinate values of the start point SP, coordinate values of the end point EP, moving direction D1 of the touch position, and moving speed of the touch position to calculate a locus of the pointer PT when the pointer PT in the control range PXY is moved from the end point EP in the moving direction D1 at a speed based on the calculated moving speed. As shown in FIG. 7, movement of the pointer PT along the calculated locus is displayed by the display control section 561.

When the pointer PT is incident on the boundary P11, a display is performed by the display control section 561, indicating that the pointer PT is reflected at the boundary P11 at the same reflection angle as an incident angle of the pointer PT to the boundary P11. The reflection at the boundary P11 is performed every time the pointer PT is incident on the boundary P11. The moving speed of the pointer PT is gradually reduced, and finally the movement of the pointer PT is stopped and the pointer PT is hidden. Since the pointer PT is moved as described above, the pinball mode can also be referred to as a billiard mode. When the touch operation is performed on the control range P1 during movement of the pointer PT, the pointer PT is stopped and hidden. In order to restart the operation on the control range P1, it is only necessary for the user to again perform the touch operation on the control range P1.

The above movement of the pointer PT applies to the operation on the control range PX and the control range PY.

In the pinball mode, the value setting section 569 sets the X-axis parameter value at a predetermined sampling rate based on the X-coordinate value and the Y-axis parameter value at a predetermined sampling rate based on the Y-coordinate value, the X-coordinate value and Y-coordinate value being coordinate values of the pointer PT to be changed from the end point EP. Then, when the pointer PT is stopped, the value setting section 569 stops the setting of the X-axis parameter value and the Y-axis parameter value, thereby stopping transmission of the parameter values. That is, the pinball mode is a mode in which the X-axis parameter value and the Y-axis parameter value are set and transmitted after the touch operation is released until the pointer PT is stopped.

Slingshot Mode

The slingshot mode is an operation mode, where, as in the pinball mode, the pointer PT is moved when the touch operation is released after the touch operation (specifically, the swipe operation) is performed in the control range P1 and the X-axis parameter value and the Y-axis parameter value are set based on the coordinate values of the pointer PT.

The pointer PT is moved from the end point EP in the moving direction D1 in the pinball mode, whereas the pointer PT is moved from the end point EP in a direction opposite to the moving direction of the touch position in the slingshot mode.

Figure 8:
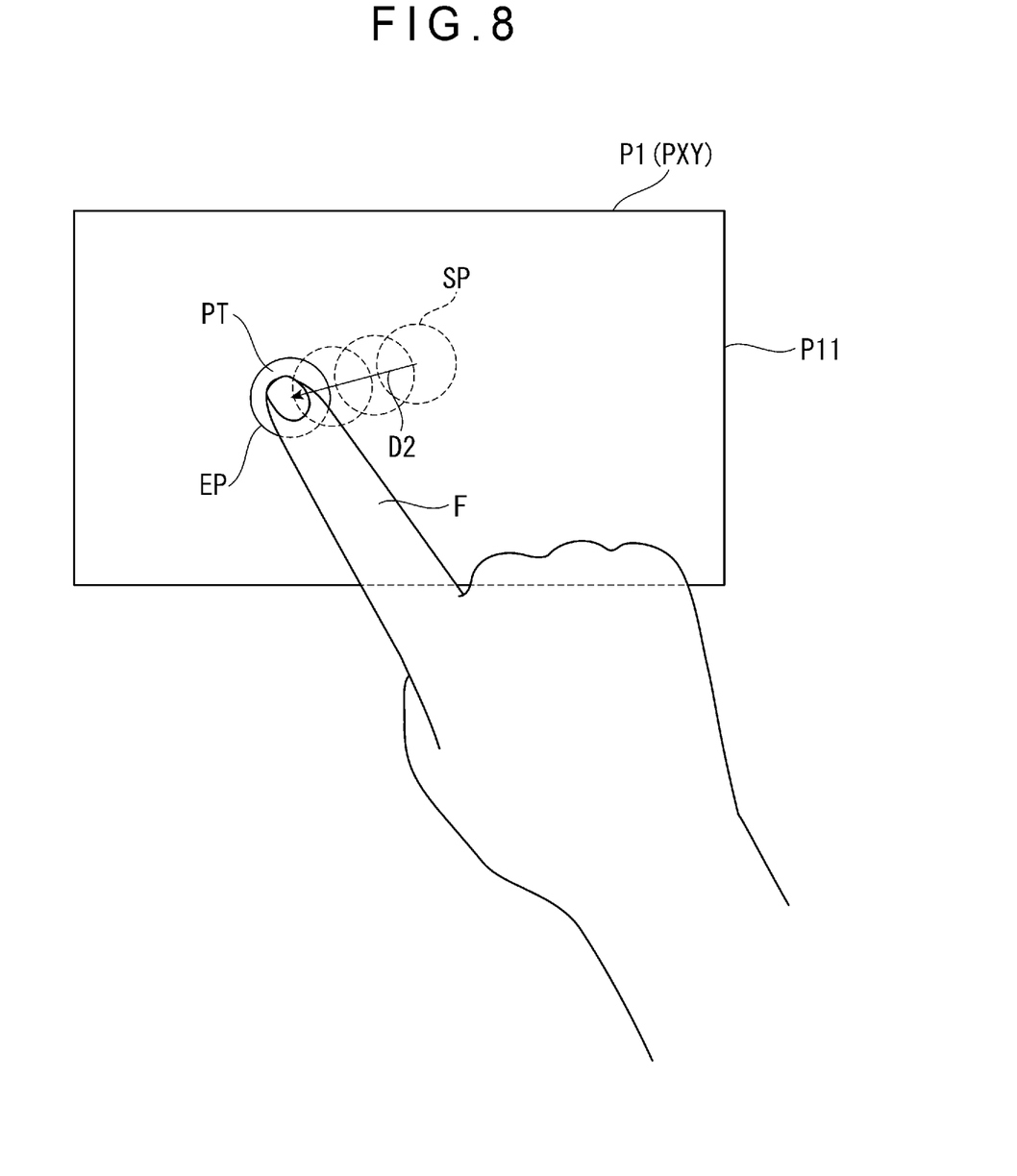
FIG. 8 illustrates a method of operating a control range in a slingshot mode according to the exemplary embodiment.

FIG. 8 illustrates a method of operating the control range PXY in the slingshot mode.

Specifically, in the slingshot mode, upon detection of the touch position, the pointer PT is displayed by the display control section 561 at a position corresponding to the touch position. Then, the operation acquiring section 567 acquires the moving direction and the moving speed from the start point to the end point based on the start point and end point of the touch operation in the control range P1.

For instance, when the user operates the control range PXY with their finger F as shown in FIG. 8, the operation acquiring section 567 acquires coordinate values of the start point SP and coordinate values of the end point EP based on coordinate values inputted through the touch panel 51 and calculates a moving direction D2 and a moving speed of the touch position from the start point SP to the end point EP. The locus calculating section 568 performs a physical calculation based on the acquired coordinate values of the start point SP, coordinate values of the end point EP, moving direction D2 of the touch position, and moving speed of the touch position to calculate a locus of the pointer PT when the pointer PT in the control range PXY is moved from the end point EP in a direction opposite the moving direction D2 at a speed based on the calculated moving speed. Movement of the pointer PT along the calculated locus is displayed by the display control section 561.

When the pointer PT is incident on the boundary P11 in the slingshot mode, the pointer PT is reflected at the boundary P11 at the same reflection angle as an incident angle of the pointer PT to the boundary P11. The moving speed of the pointer PT is gradually reduced, and finally the movement of the pointer PT is stopped and the pointer PT is hidden. When the touch operation is performed on the control range P1 during movement of the pointer PT, the pointer PT is stopped and hidden. In order to restart the operation on the control range P1, it is only necessary for the user to again perform the touch operation on the control range P1.

The above movement of the pointer PT applies to the operation on the control range PX and the control range PY.

In the slingshot mode, similar to the pinball mode, the value setting section 569 sets the X-axis parameter value at a predetermined sampling rate based on the X-coordinate value and the Y-axis parameter value at a predetermined sampling rate based on the Y-coordinate value, the X-coordinate value and Y-coordinate value being coordinate values of the pointer PT to be changed from the end point EP. Then, when the pointer PT is stopped, the value setting section 569 stops the setting of the X-axis parameter value and the Y-axis parameter value, thereby stopping transmission of the parameter values. That is, the slingshot mode is a mode in which the X-axis parameter value and the Y-axis parameter value are set and transmitted after the touch operation is released until the pointer PT is stopped.

Operation Process

Figure 9:
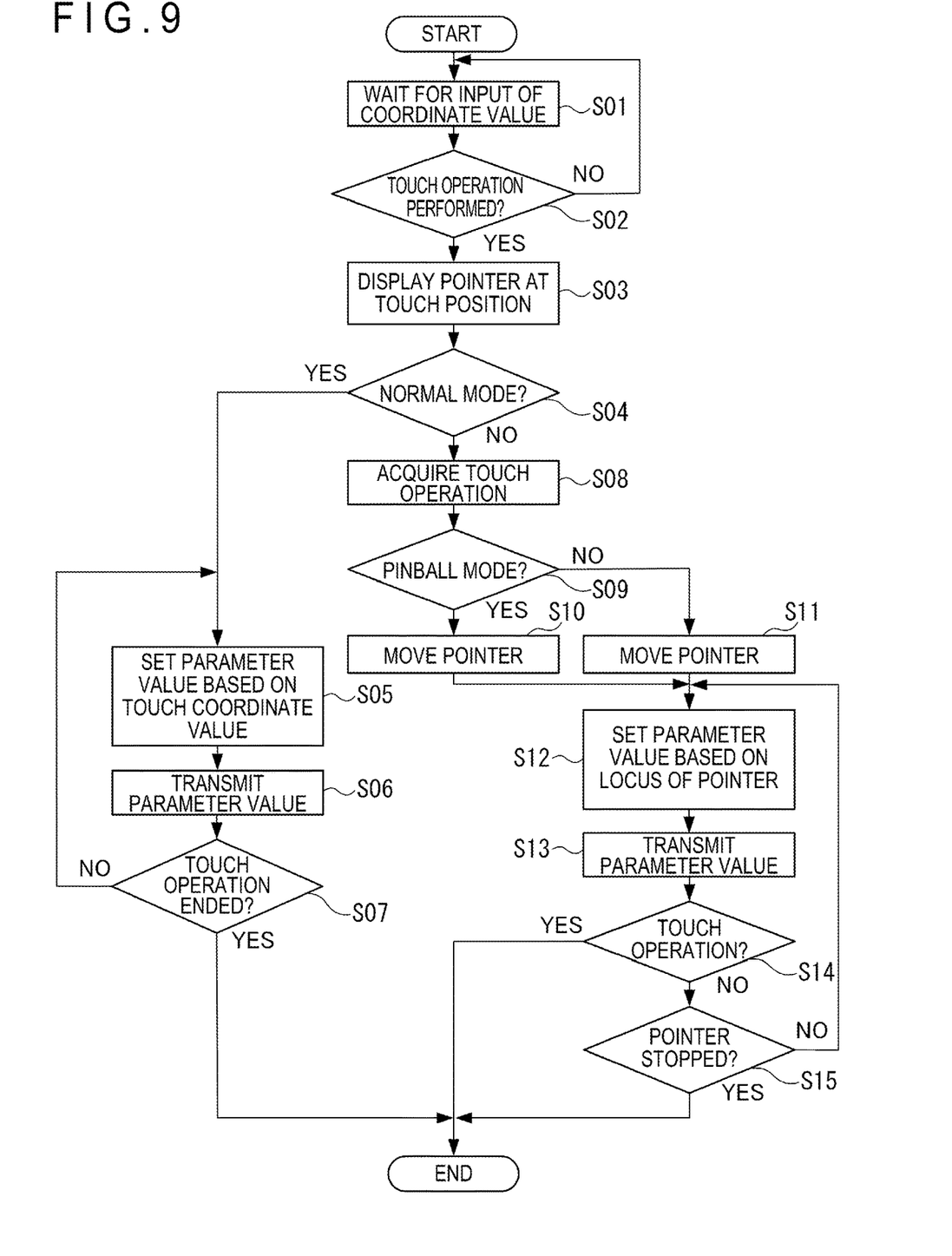
FIG. 9 is a flowchart showing an operation process according to the exemplary embodiment.

FIG. 9 is a flowchart showing an operation process performed by the control section 56.

As described above, the control section 56 runs the operation program stored in the storage 54 to perform the operation process for transmitting parameter values of effects to be applied by the mixer 4 in accordance with the user's touch operation on the control range P1 of the operation screen PS.

A flow of the operation process will be described below. It is assumed that the X-axis effect and the Y-axis effect are preset by the effect setting section 562 and the channel to be applied with the effects is preset by the channel setting section 563.

In the operation process, as shown in FIG. 9, the control section 56 waits for the input of coordinate values of the touch position through the touch panel 51 (Step S01).

Subsequently, the touch determining section 565 determines whether the touch operation is performed based on the inputted coordinate values (Step S02).

When it is determined in the determination process of Step S02 that the touch operation is not performed (Step S01: NO), the control section 56 returns the process to Step S01.

When it is determined in the determination process of Step S02 that the touch operation is performed (Step S02: YES), the display control section 561 displays the pointer PT at a position corresponding to the touch position in the control range P1 (Step S03).

Next, the mode determining section 566 determines whether the operation mode of the operation device 5 is the normal mode (Step S04).

When it is determined in the determination process of Step S04 that the operation mode is the normal mode (Step S04: YES), the value setting section 569 sets the X-axis parameter value and the Y-axis parameter value based on the touch position in the control range P1 (Step S05).

After Step S05, the value transmitting section 570 transmits, to the mixer 4, the type of the effects, the channel, the X-axis parameter value, and the Y-axis parameter value that are set as described above (Step S06).

After Step S06, the touch determining section 565 determines whether the touch operation has ended (i.e. whether a user's finger F or a stylus pen is separated from the touch panel 51 to release the touch operation) (Step S07).

When it is determined in the determination process of Step S07 that the touch operation is not ended (Step S07: NO), the control section 56 returns the process to Step S05 and continues the setting of the parameter values corresponding to the touch position.

When it is determined in the determination process of Step S07 that the touch operation is ended (Step S07: YES), the control section 56 terminates the operation process. It should be noted that the operation process is repeatedly performed.

When it is determined in the determination process of Step S04 that the operation mode is not the normal mode (Step S04: NO), the operation acquiring section 567 acquires coordinate values of the start point SP, coordinate values of the end point EP, the moving direction D2 of the touch position from the start point SP to the end point EP, and a moving speed of the touch position (Step S08).

Next, the mode determining section 566 determines whether the operation mode of the operation device 5 is the pinball mode (Step S09).

When it is determined in the determination process of Step S09 that the operation mode is the pinball mode, the locus calculating section 568 calculates, based on information acquired by the operation acquiring section 567, a locus of the pointer PT for the movement from the end point in the moving direction (from the start point to the end point) at a speed based on the calculated moving speed. Then, the display control section 561 moves the pointer PT along the calculated locus (Step S10). Subsequently, the control section 56 advances the process to Step S12.

When it is determined in the determination process of Step S09 that the operation mode is not the pinball mode (i.e. when it is determined that the operation mode is the slingshot mode), the locus calculating section 568 calculates, based on information acquired by the operation acquiring section 567, a locus of the pointer PT for the movement from the end point in a direction opposite the moving direction (i.e. from the start point to the end point) at a speed based on the calculated moving speed. Then, the display control section 561 moves the pointer PT along the calculated locus (Step S11). Subsequently, the control section 56 advances the process to Step S12.

In Step S12, the value setting section 569 sets the X-axis parameter value and the Y-axis parameter value based on the position of the pointer PT whose locus is calculated by the locus calculating section 568 in Step S10 or Step S11 and whose movement in the control range P1 is displayed by the display control section 561 (Step S12). Step S12 corresponds to a value setting procedure and a value setting step.

After Step S12, similarly to Step S06, the value transmitting section 570 transmits, to the mixer 4, the type of the effects, the channel, the X-axis parameter value, and the Y-axis parameter value that are set (Step S13).

Then, the touch determining section 565 determines whether the touch operation is performed during the movement of the pointer PT (Step S14).

When it is determined in the determination process of Step S14 that the touch operation is performed (Step S14: YES), the control section 56 terminates the operation process. It should be noted that the operation process is repeatedly performed.

When it is determined in the determination process of Step S14 that the touch operation is not performed (Step S14: NO), the control section 56 determines whether the pointer PT is stopped (Step S15).

When it is determined in the determination process of Step S15 that the pointer PT is not stopped (Step S15: NO), the control section 56 returns the process to Step S12 and continues the setting of the parameter values by the value setting section 569 and the transmission to the mixer 4 by the value transmitting section 570.

When it is determined in the determination process of Step S15 that the pointer PT is stopped (Step S14: YES), the control section 56 terminates the operation process. It should be noted that the operation process is repeatedly performed.

Other Processes

As described above, the output control section, which is one of the first output control section 431 and the second output control section 432 of the mixer 4, controls the target channel through the operation device 5, so that effects corresponding to the type received from the operation device 5 is applied to the audio of the target channel based on the X-axis parameter value and the Y-axis parameter value.

At this time, the output control section is optionally configured to adjust a timing, at which a degree of effects is changed according to the variation in the parameter values, to the music piece based on quantization information. The quantization information refers to information for correcting the timing. This allows the effects to be applied without ruining the music even when the pointer PT is randomly operated in the pinball mode or the slingshot mode.

Further, in applying the effects to the audio of the target channel, the output control section is optionally configured to adjust the variation speed of the parameter values corresponding to the moving speed of the pointer PT in accordance with the type of the effects to be applied.

Further, when the preset beat of the target channel is 4 beats in the mixer 4, the output control section is optionally configured to store the parameter values for 4 beats and repeatedly apply the effects based on the stored parameter values for the 4 beats. This enables effects with randomness to be periodically intensified in applying the effects.

Further, the mixer 4 may have a function that any of the followings is selectable when the beat is halved by a sequencer: the sequencer is turned off at a latter half to play with a half-length or the playing speed is doubled to play with a half-length without turning off the sequencer. This provides a wide range of performance.

The locus calculating section 568 is optionally configured to adjust a maximum value of the moving speed of the pointer PT based on beats per minute (BPM) of the target channel received from the mixer 4 when calculating the position of the pointer PT moved in accordance with the moving speed of the touch position, the position corresponding to an elapsed time from the end of the touch operation. That is, the locus calculating section 568 is optionally configured to adjust the moving speed of the pointer PT based on the BPM of the target channel. In that case, an amount of change in effects applied to a music piece is adjustable in accordance with the type of the music piece and the like.

Effects of Exemplary Embodiment

The following effects can be achieved by the acoustic system 1 according to the above-described exemplary embodiment.

The acoustic system 1 includes the acoustic device 10 including the mixer 4 and the operation device 5.

The operation device 5 includes the touch panel 51 for detecting the user's touch operation and the value setting section 569 for setting parameter values based on the touch operation detected by the touch panel 51. The mixer 4 includes the output control section 43 for processing the inputted audio based on the parameter values set by the value setting section 569 and outputting the processed audio.

The value setting section 569 sets the parameter values in accordance with the moving direction and the moving speed of the touch position from the start point (i.e., the touch position on the touch panel 51 at the start of the touch operation) to the end point (i.e., the touch position at the end of the touch operation).

According to the above arrangement, the parameter values can be continuously changed without continuing the touch operation on the touch panel 51, thus simplifying the user's operation for changing the parameter values.

The operation device 5 of the acoustic device 10 includes the display panel 52 provided with the touch panel 51 and the display control section 561 for displaying the pointer PT movable by the touch operation on the display panel 52. Specifically, the display control section 561 displays the pointer PT in the control range P1 of the operation screen PS displayed on the display panel 52. The display control section 561 moves the pointer PT in accordance with the moving direction and moving speed of the touch position from the start point to the end point of the touch operation.

The above arrangement allows a user to visually recognize the change in the parameter values caused by the user's operation. That is, the above arrangement allows a user to easily understand how the parameter values change in accordance with the operation of the pointer PT.

The display control section 561 of the acoustic device 10 displays the boundary P11, which defines a movable range of the pointer PT, in the control range P1 of the operation screen PS displayed on the display panel 52. When the pointer PT is incident on the boundary P11, the display control section 561 displays the pointer PT reflected at the boundary P11. The value setting section 569 sets parameter values in accordance with the position of the pointer PT.

According to the above arrangement, when only one of the X-axis parameter value and the Y-axis parameter value is changed (e.g. when the pointer PT is operated in the control range PX or PY), the parameter value can be easily continuously increased/decreased.

Further, when the X-axis parameter value and the Y-axis parameter value are simultaneously changed (e.g. when the pointer PT is operated in the control range PXY), the two parameter values can be easily continuously increased/decreased. In addition, it is possible to easily perform, for instance, an operation in which, while one of the X-axis parameter value and the Y-axis parameter value is continuously increased/decreased, the other is continuously increased and then continuously decreased. The versatility of the acoustic device 10 can thus be enhanced.

In the acoustic device 10, the output control section 43 of the mixer 4 applies the effects to the inputted audio in accordance with the parameter values received from the operation device 5.

According to such an arrangement, the effects with varying parameter values can be easily applied to the audio inputted to the mixer 4.

In the acoustic device 10, the effects, whose parameter values are set by the operation device 5 and which are applied to the audio by the mixer 4, are categorized into at least one of BEAT FX or SOUND COLOR FX.

According to such an arrangement, the operation on the touch panel 51 for causing a continuous change in the parameter values of the above type of the effects can be easily performed.

The touch panel 51 of the acoustic device 10 has two orthogonal axes. An effect categorized into BEAT FX is set for the X axis (one of the two axes) and another effect categorized into SOUND COLOR FX is set for the Y axis (the other of the two axes).

According to such an arrangement, the parameter values of two different types of effects can be simultaneously manipulated. The versatility of the acoustic device 10 can thus be enhanced.

The acoustic device 10, which has the touch panel 51, applies effects to the inputted music piece. The operation method performed using the acoustic device 10 includes a value setting procedure. In the value setting procedure, the parameter values of the effects are set in accordance with the moving direction and the moving speed of the touch position from the start point (i.e., the touch position on the touch panel 51 at the start of the user's touch operation) to the end point (i.e., the touch position at the end of the touch operation).

This operation method, which is performed by the acoustic device, achieves the same effects as those of the above-described acoustic device 10.

The acoustic device 10, which has the touch panel 51, applies effects to an inputted music piece.
The operation program, which is run by the acoustic device 10, commands the acoustic device 10 to perform the value setting step. In the value setting step, the parameter values of the effects are set in accordance with the moving direction and the moving speed of the touch position from the start point (i.e., the touch position on the touch panel 51 at the start of the user's touch operation) to the end point (i.e., the touch position at the end of the touch operation).

The operation program, which is performed by the acoustic device, achieves the same effects as those of the above-described acoustic device 10.

Modification of Exemplary Embodiment

The present disclosure is not limited to the above exemplary embodiment but includes modifications, improvements, and the like as long as the object of the present disclosure can be achieved.

In the above exemplary embodiment, the acoustic device 10 includes the mixer 4 and the operation device 5 in a form of separate components. However, the mixer 4 and the operation device 5 are not necessarily separate components but may be integrated. Further, the mixer 4 of the acoustic device 10 may be replaced by an effector, an all-in-one DJ system, or the music piece supply device 3 configured to run a DJ application software. In other words, the device to which the operation device 5 transmits parameter values does not necessarily have a plurality of channels. Further, the acoustic device may be the music piece supply device.

In the above exemplary embodiment, the control range P1 defined in the operation screen PS includes the control range PXY where the X-axis parameter value and the Y-axis parameter value can be controlled by controlling the pointer PT, the control range PX where the X-axis parameter value can be controlled by controlling the pointer PT, and the control range PY where the Y-axis parameter value can be controlled by controlling the pointer PT. However, the control range P1 is not necessarily configured as described above but may include one or two of the control ranges PXY, PX, and PY. For instance, the control ranges PX and PY are not necessarily provided when the control range PXY is provided. Alternatively, the control range PXY is not necessarily provided when the control ranges PX and PY are provided.

In the above exemplary embodiment, the operation device 5 includes the display panel 52 that displays the pointer PT on the touch panel 51 at a position corresponding to the user's touch operation. However, the display panel 52 is not necessarily provided but is optionally omitted. In this case, the display control section 561 can also be omitted.

The pointer PT, which is not necessarily circular, may have any other shape such as elliptical or rectangular. Further, the control range PXY, which is not necessarily rectangular, may be circular or may be in any other polygonal shape.

In the above exemplary embodiment, the mixer 4 applies the effects to the inputted audio based on the parameter values received from the operation device 5. However, the acoustic device 10 is not necessarily configured as described above but may perform any other operation than the effects as long as the inputted audio can be processed in accordance with the parameter values that vary in accordance with the touch operation on the touch panel 51. For instance, the acoustic device of the present disclosure may increase/decrease an audio volume in a specific frequency band included in the inputted audio based on the determined parameter values.

In the above exemplary embodiment, one of the effects categorized into BEAT FX is set as the X-axis effect, and one of the effects categorized into SOUND COLOR FX is set as the Y-axis effect. However, the X-axis and Y-axis effects are not necessarily set as described above. One of the effects categorized into SOUND COLOR FX may be set as the X-axis effect, and one of the effects categorized into BEAT FX may be set as the Y-axis effect.

Alternatively, both of the X-axis effect and the Y-axis effect may be effects categorized into BEAT FX or effects categorized into SOUND COLOR FX.

In the above exemplary embodiment, the operation mode of the operation device 5 is exemplified by the normal mode, pinball mode, and slingshot mode. However, the normal mode is not necessarily included in the operation mode as long as the pinball mode or the slingshot mode is included in the operation mode of the operation device 5.

In the above exemplary embodiment, the operation program run by the control section 56 of the operation device 5 is stored in the storage 54. However, the operation program is not necessarily configured as described above. For instance, the operation program may be read from a storage medium to be run when the above-described operation process is performed. Examples of the above storage medium include a disk-shaped storage medium and a semiconductor memory. Alternatively, the operation program may be acquired from a device on a network (e.g., server).

EXPLANATION OF CODES

1 . . . acoustic system, 10 . . . acoustic device, 4 . . . mixer, 5 . . . operation device, 41 . . . input section, 411 . . . first input section, 412 . . . second input section, 42 . . . operation section, 43 . . . output control section, 431 . . . first output control section, 432 . . . second output control section, 44 . . . output section, 51 . . . touch panel, 52 . . . display panel, 53 . . . communication section, 54 . . . storage, 55 . . . memory, 56 . . . control section 561 . . . display control section 562 . . . effect setting section, 563 . . . channel setting section, 564 . . . mode setting section, 565 . . . touch determining section, 566 . . . mode determining section, 567 . . . operation acquiring section, 568 . . . locus calculating section, 569 . . . value setting section, 570 . . . value transmitting section, D1, D2 . . . moving direction, EP . . . end point, PT . . . pointer, SP . . . start point

The invention claimed is:

1. An acoustic device, comprising:
a display panel configured to display a pointer in two-dimensional coordinates thereon;
a touch panel configured to detect a user's touch operation;
a memory; and
a processor, wherein
the processor is configured to:
move the pointer in the two-dimensional coordinates after an end of the touch operation, in accordance with a moving direction and a moving speed of a touch position from a start point, which is the touch position at a start of the touch operation on the touch panel, to an end point, which is the touch position at the end of the touch operation;
set a parameter value based on coordinate values of the pointer; and
apply an effect to an inputted audio in accordance with the set parameter value.

2. The acoustic device according to claim 1, wherein the touch panel is provided on the display panel.

3. The acoustic device according to claim 2, wherein the processor is configured to display a boundary that defines a movable range of the pointer on the display panel and display the pointer reflected at the boundary in a case where the pointer is incident on the boundary, and set the parameter value in accordance with a position of the pointer.

4. The acoustic device according to claim 1, wherein the effect is categorized into at least one of BEAT FX or SOUND COLOR FX.

5. The acoustic device according to claim 4, wherein the touch panel comprises two orthogonal axes, and
the effect comprises a first effect and a second effect, the first effect categorized into one of BEAT FX and SOUND COLOR FX being set for one of the two axes, the second effect categorized into the other of BEAT FX and SOUND COLOR FX being set for the other of the two axes.

6. The acoustic device according to claim 1, wherein the processor is configured to move the pointer from a position corresponding to the end point in the two-dimensional coordinates after the end of the touch operation.

7. An operation method performed using an acoustic device provided with a display panel and a touch panel and configured to apply an effect to an inputted audio, the operation method comprising:
moving a pointer in two-dimensional coordinates of the display panel after an end of a user's touch operation, in accordance with a moving direction and a moving speed of a touch position from a start point, which is the touch position at a start of the touch operation on the touch panel, to an end point, which is the touch position at the end of the touch operation;
setting a parameter value based on coordinate values of the pointer; and
applying the effect to the inputted audio in accordance with the set parameter value.

8. The operation method according to claim 7, wherein in the moving of the pointer, the pointer is moved from a position corresponding to the end point in the two-dimensional coordinates after the end of the touch operation.

9. A non-transitory computer-readable recording medium recording an operation program performed using a processor of an acoustic device provided with a display panel and a touch panel and configured to apply an effect to an inputted audio,
the operation program being configured to make the processor of the acoustic device perform:
moving a pointer in two-dimensional coordinates of the display panel after an end of a user's touch operation, in accordance with a moving direction and a moving speed of a touch position from a start point, which is the touch position at a start of the touch operation on the touch panel, to an end point, which is the touch position at the end of the touch operation;
setting a parameter value based on coordinate value of the pointer; and
applying the effect to the inputted audio in accordance with the set parameter value.

10. The recording medium according to claim 9, wherein in the moving of the pointer, the pointer is moved from a position corresponding to the end point in the two-dimensional coordinates after the end of the touch operation.

* * * * *